(12) United States Patent
Koide

(10) Patent No.: US 11,956,656 B2
(45) Date of Patent: Apr. 9, 2024

(54) DEVICE MANAGEMENT PROGRAM AND DEVICE MANAGEMENT METHOD

(71) Applicant: SEIKO EPSON CORPORATION, Tokyo (JP)

(72) Inventor: Tomohiko Koide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 172 days.

(21) Appl. No.: 17/660,351

(22) Filed: Apr. 22, 2022

(65) Prior Publication Data

US 2022/0345917 A1    Oct. 27, 2022

(30) Foreign Application Priority Data

Apr. 23, 2021 (JP) ................... 2021-073587

(51) Int. Cl.
*H04W 24/08* (2009.01)
*G06F 3/12* (2006.01)
*H04L 61/5007* (2022.01)

(52) U.S. Cl.
CPC ............ *H04W 24/08* (2013.01); *G06F 3/121* (2013.01); *G06F 3/1236* (2013.01); *G06F 3/1292* (2013.01); *H04L 61/5007* (2022.05)

(58) Field of Classification Search
USPC .......................................................... 370/252
See application file for complete search history.

(56) References Cited

U.S. PATENT DOCUMENTS

| 2012/0017126 | A1  | 1/2012  | Yamano  |            |
|--------------|-----|---------|---------|------------|
| 2016/0295436 | A1* | 10/2016 | Oba     | H04L 43/065 |
| 2017/0286021 | A1* | 10/2017 | Katano  | G06F 3/1292 |

FOREIGN PATENT DOCUMENTS

JP         2012022562 A    2/2012

* cited by examiner

*Primary Examiner* — Darryl V Dottin
(74) *Attorney, Agent, or Firm* — CHIP LAW GROUP

(57) ABSTRACT

A device management program causes a terminal device to function as a storing unit configured to store first access point information concerning a first access point and first device information, which is device information concerning a connected device, in correlation with each other in advance, a communication-state confirming unit configured to confirm a communication state at predetermined timing, an access-point-information acquiring unit configured to, when the communication state is a communication error state, acquire second access point information concerning a second access point that is in the communication error state, a determining unit configured to determine whether the second access point information and the first access point information coincide, a communication-state-information acquiring unit configured to acquire information concerning a communication state with the device when the second access point information and the first access point information coincide, and a communication-state notifying unit configured to perform a notification, which is a notification of the information concerning the communication state with the device.

10 Claims, 5 Drawing Sheets

DEVICE MANAGEMENT PROGRAM AND DEVICE MANAGEMENT METHOD

The present application is based on, and claims priority from JP Application Serial Number 2021-073587, filed Apr. 23, 2021, the disclosure of which is hereby incorporated by reference herein in its entirety.

BACKGROUND

1. Technical Field

The present disclosure relates to a terminal device connected via a network, a device management program, and a device management method.

2. Related Art

There has been known, for example, a technique for periodically checking a communication state of a printing device connected to a computer via a network. JP-A-2012-22562 (Patent Literature 1) discloses a technique in which, when a computer and a printing device are connected via a network, a communication monitoring device performs a communication error notification when it is not confirmed in a periodic communication state check that communication connection is normal.

Patent Literature 1 discloses a technique in which, even if the communication connection is abnormal, the communication monitoring device does not determine that a communication error has occurred and does not perform the communication error notification when determining that a cause of the communication connection abnormality is switching of communication speed. However, when a communication error occurs, a user cannot discriminate whether a cause of the communication error is a communication failure between the computer and an access point or a connection state of the printing device.

SUMMARY

An aspect of the present disclosure is directed to a nontransitory computer-readable medium storing a device management program operating in a control device that communicates with a device via an access point, the device management program causing the control device to function as: a storing unit configured to store first access point information concerning a first access point and first device information concerning the device connected via the first access point in correlation with each other in advance; a communication-state confirming unit configured to confirm a communication state at predetermined timing; an access-point-information acquiring unit configured to, when the communication state confirmed by the communication-state confirming unit is a communication error state, acquire second access point information concerning a second access point that is in the communication error state; a determining unit configured to determine whether the acquired second access point information and the first access point information stored in advance coincide; a communication-state-information acquiring unit configured to acquire information concerning the communication with the device when the determining unit determines that the acquired second access point information and the first access point information stored in advance coincide; and a communication-state notifying unit configured to perform a notification based on the information acquired by the communication-state-information acquiring unit.

Another aspect of the present disclosure is directed to a device management method for a control device that communicates with a device via an access point, the device management method including: communicating with the device via a first access point; when communicating with the device, storing first access point information concerning the first access point and first device information concerning the device, which communicates via the first access point, in correlation with each other in advance; confirming a communication state at predetermined timing; when the confirmed communication state is a communication error state, acquiring second access point information concerning an access point that is in the communication error state; determining whether the acquired second access point information and the first access point information stored in advance coincide; when determining that the second access point information and the first access point information coincide, confirming the communication with the device; and performing a notification concerning the communication with the device based on a result obtained by confirming the communication with the device.

DESCRIPTION OF EXEMPLARY EMBODIMENTS

Figure 1:
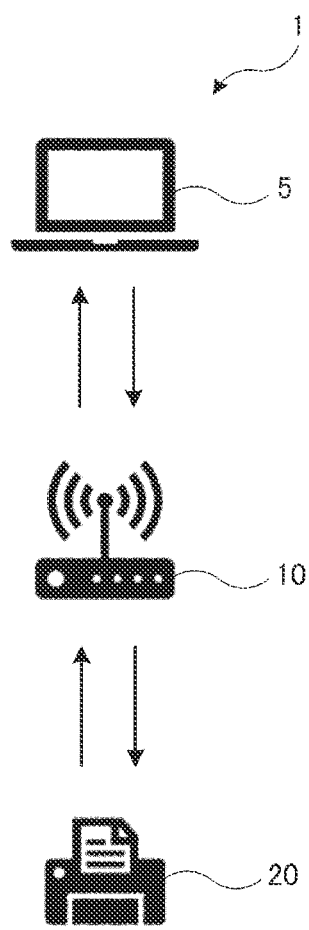
FIG. 1 is a diagram showing the configuration of a printing system.

Embodiments are explained below with reference to the accompanying drawings. FIGS. 1 to 5 show examples of the embodiments. In the figures, portions denoted by the same reference numerals and signs represent the same objects. In the figures, a part of components are omitted and simplified as appropriate. The sizes, the shapes, the thicknesses, and the like of members are exaggerated and represented as appropriate.

FIG. 1 is a diagram showing the configuration of a printing system 1 including a terminal device 5, various functions of which explained below are realized by a device management program according to a first embodiment. The printing system 1 includes the terminal device 5, an access point 10, and a printing device 20, which is a device.

The terminal device 5 is a personal computer. The access point 10 is a wireless LAN router. The terminal device 5 and the access point 10 are connected by wireless connection according to a communication standard such as WiFi (registered trademark). The access point 10 and the printing device 20 are also connected by wireless connection according to the communication standard such as WiFi (registered trademark). The access point 10 configures network connection in a home or in an office. The terminal device 5 transmits information such as a printing job to the printing device 20 via a network configured by the access point 10 and causes the printing device 20 to perform print processing. The printing device 20 transmits information such as a processing state and an ink residual amount of the printing device 20 to the terminal device 5 through the access point 10.

Figure 2:
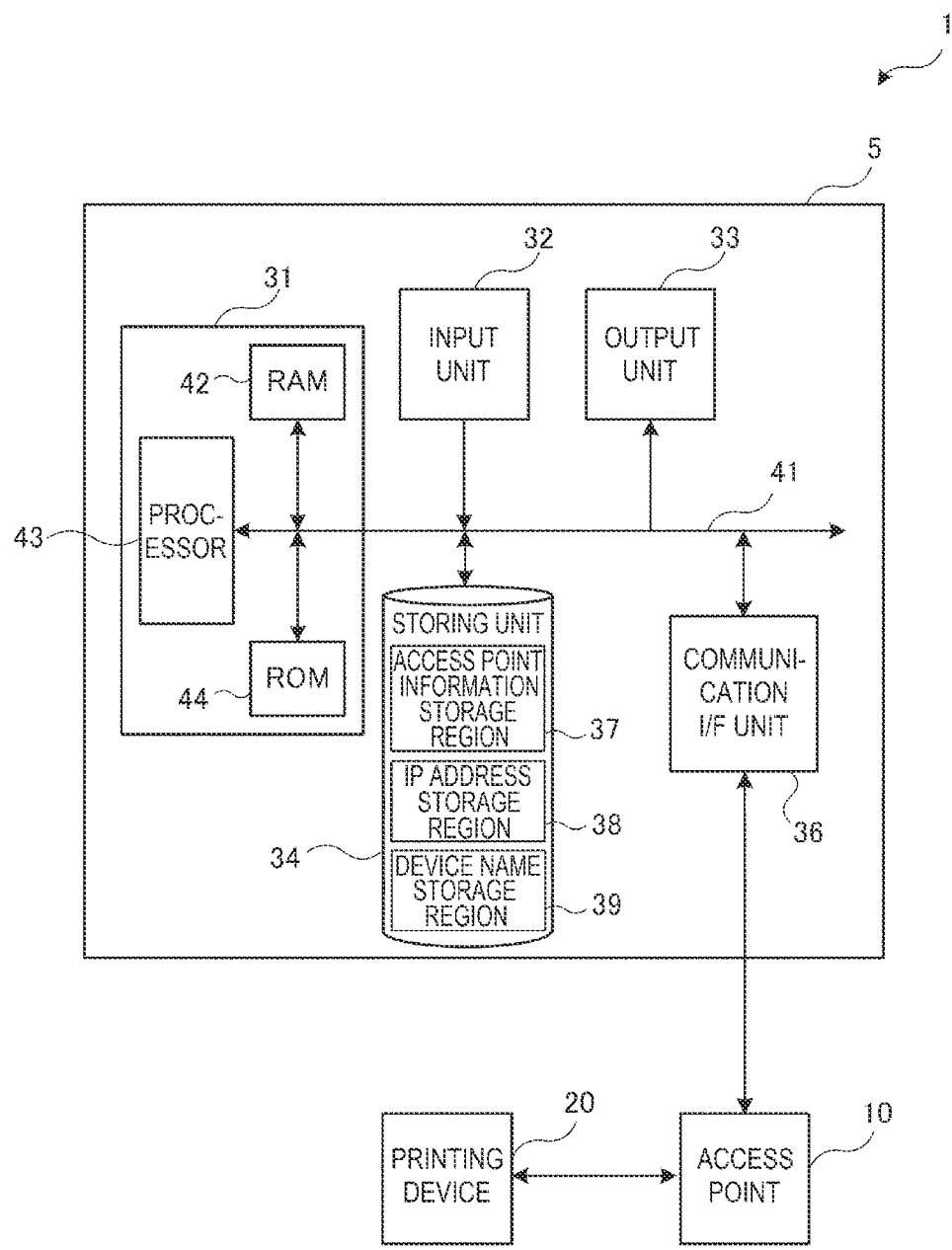
FIG. 2 is a diagram showing the configuration of a terminal device.

FIG. 2 is a configuration diagram showing the configuration of the terminal device 5 included in the printing system 1. The terminal device 5 is an information processing device. Examples of the terminal device 5 include, other than a personal computer, a portable information terminal such as a smartphone and a tablet PC. The terminal device 5 includes a control unit 31 that controls the entire terminal device 5, an input unit 32 for inputting information, an output unit 33 for outputting information, a storing unit 34 that stores information, and a communication I/F unit 36 that transmits and receives information to and from the outside. The units of the terminal device 5 are connected by a bus 41 and exchange information.

The control unit 31 includes a processor 43 that performs an arithmetic operation, a volatile storage element, that is, a RAM (Random Access Memory) 42, and a nonvolatile storage element, that is, a ROM (Read Only Memory) 44. The storing unit includes an access point information storage region 37 for storing access point information, which is information concerning an access point explained below. The storing unit 34 includes an IP address storage region 38 for storing information concerning an IP address of the printing device 20, which is a device connected to a network. The storing unit 34 includes a device name storage region 39 for storing a device name, which is a name given to the connected device.

The processor 43 may be a CPU (Central Processing Unit). The input unit 32 may be a keyboard or a touch panel. The output unit 33 may be a liquid crystal panel, an organic EL panel, or the like or may be an image display unit of a portable information terminal. The storing unit 34 may include a storage medium such as a hard disk or an SSD. The communication I/F unit 36 may be an interface for USB connection or may be a wireless communication interface for wireless connection. The terminal device 5 transmits and receives information to and from the printing device 20 via the access point 10.

Figure 3:
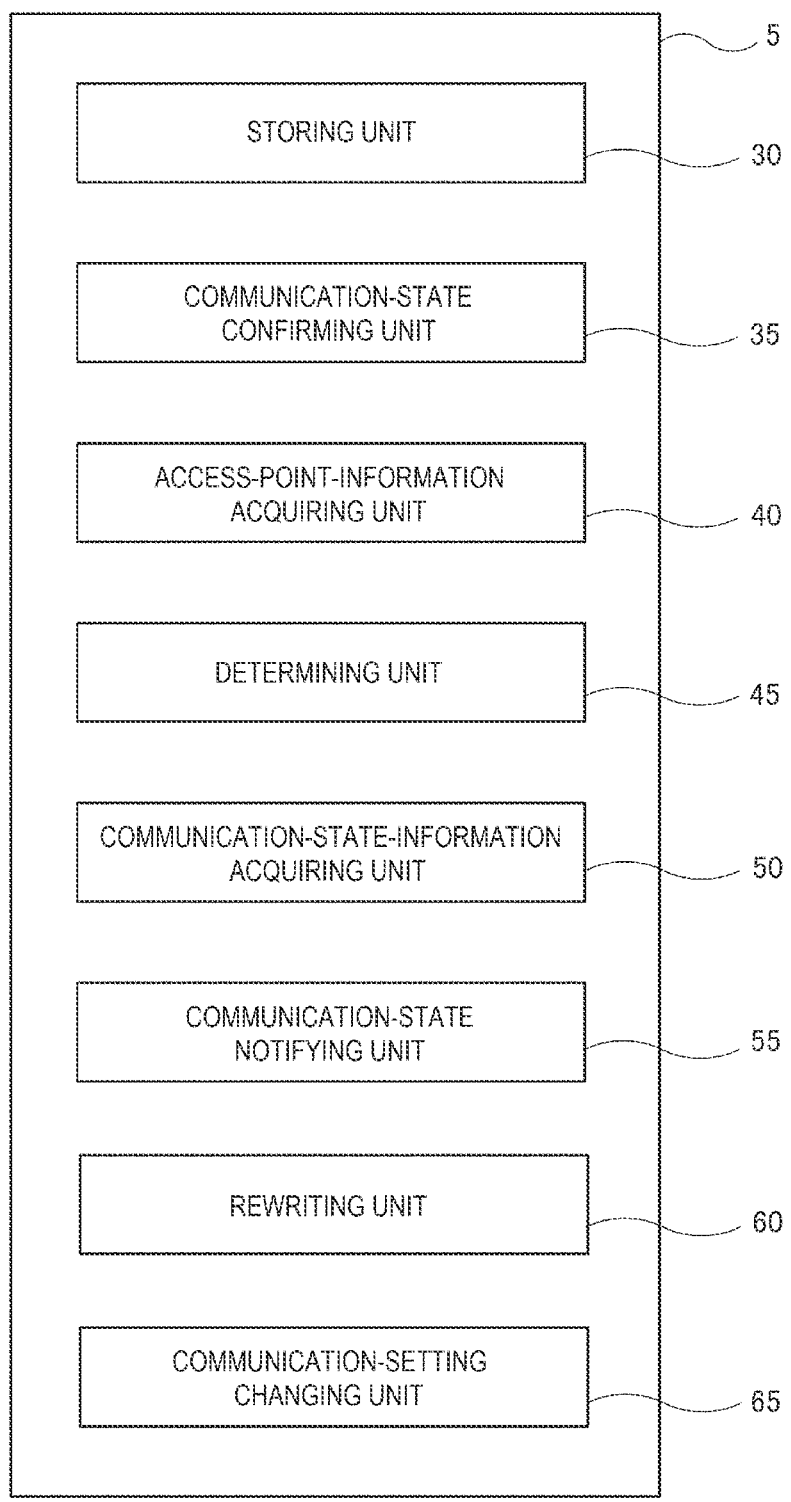
FIG. 3 is a functional block diagram of the terminal device.

FIG. 3 is a functional block diagram of the terminal device 5. The device management program according to this embodiment causes the terminal device 5, which is a control device, to function as various units shown in FIG. 3.

The device management program operates in the terminal device 5 connected to the printing device 20 via the access point 10. The device management program causes the terminal device 5 to function as a storing unit 30. The storing unit 30 stores first access point information concerning the access point 10 equivalent to a first access point.

The device management program causes the terminal device 5 to function as the storing unit 30. The storing unit 30 stores device information concerning the printing device 20, which is the device connected to the terminal device 5 via the first access point, in advance in correlation with the first access point information. The device information concerning the printing device 20 corresponds to first device information.

The access point information is an SSID of the wireless LAN router, which is the access point 10. The device information includes an IP address of the printing device 20 and a device name of the printing device 20.

The device management program causes the terminal device 5 to function as a communication-state confirming unit 35. The communication-state confirming unit 35 confirms a communication state at predetermined timing.

The predetermined timing for confirming the communication state may be periodic timing. The predetermined timing may be a period in which the device management program is operating, for example, every thirty seconds. Alternatively, the predetermined timing may be a start time of the device management program.

The device management program causes the terminal device 5 to function as an access-point-information acquiring unit 40. When the communication state is a communication error state, the access-point-information acquiring unit 40 acquires second access point information concerning a second access point, which is an access point that is in the communication error state.

The device management program causes the terminal device 5 to function as a determining unit 45. The determining unit 45 determines whether the second access point information and the first access point information stored in advance coincide.

When the terminal device 5 is connected anew to an access point different from an access point to which the terminal device 5 was connected in the past, the first access point information and the second access point information do not coincide. Information concerning the access point to which the terminal device 5 was connected in the past corresponds to the first access point information. Information concerning the access point to which the terminal device 5 is connected anew corresponds to the second access point information. The first access point information and the second access point information are different when a user changes a wireless LAN router to which the terminal device 5 is connected.

The device management program causes the terminal device 5 to function as a communication-state-information acquiring unit 50. When the determining unit 45 determines that the second access point information and the first access point information coincide, the communication-state-information acquiring unit 50 acquires information concerning a communication state with the access point 10. The communication-state-information acquiring unit 50 acquires states such as the strength of a communication signal or presence or absence of noise as the communication state with the access point 10.

The device management program causes the terminal device 5 to function as a communication-state notifying unit 55. The communication-state notifying unit 55 causes the terminal device to perform a notification, which is a notification of information concerning the communication state with the access point 10 acquired by the communication-state-information acquiring unit 50. As an example, the communication-state notifying unit 55 performs a notification indicating that, as the communication state, the communication signal is weak when the communication signal is lower than a predetermined threshold.

The device management program causes the terminal device 5 to function as a communication-state notifying unit 55. When the communication-state-information acquiring unit 50 cannot acquire the device information, the communication-state notifying unit 55 causes the terminal device 5 to perform a notification indicating to that effect. The notification may be output to the output unit 33 shown in FIG. 2 explained above. The communication-state notifying unit 55 may cause a screen of a screen display device, which is the output unit 33, to display, as an image, a message to the effect that the device information cannot be acquired. The device information includes the IP address and the device name of the printing device 20.

The notification may be a notification for notifying the terminal device 5 that the printing device 20 is not connected to the first access point.

The device management program causes the terminal device 5 to function as the communication-state notifying unit 55. The communication-state-information acquiring unit 50 sometimes can acquire second device information, which is new device information. The acquired second device information includes a second device name and a second IP address. The storing unit 30 stores the first device information including a first device name and a first IP address. When the communication-state-information acquiring unit 50 acquires the second device information and the determining unit 45 determines that the first device name and the second device name coincide and the first IP address and the second IP address do not coincide, the communication-state notifying unit 55 causes the terminal device 5 to perform a notification. The notification indicates that the first IP address and the second IP address do not coincide.

When the communication-state notifying unit 55 satisfies a condition for performing the notification indicating that the first IP address and the second IP address do not coincide, the device management program causes the terminal device 5 to function as a rewriting unit 60. The rewriting unit 60 rewrites the first IP address included in the first device information stored in the storing unit 30 to the second IP address.

The device management program causes the terminal device 5 to function as a communication-setting changing unit 65. The communication-setting changing unit 65 changes, in network connection, communication setting concerning connection to the printing device 20 to communication setting in which the second IP address is used. The device management program causes the terminal device 5 to function as the communication-state notifying unit 55. The communication-state notifying unit 55 performs a notification indicating that the communication-setting changing unit 65 has changed the communication setting concerning the connection to the printing device 20 to the communication setting in which the second IP address is used.

Figure 4:
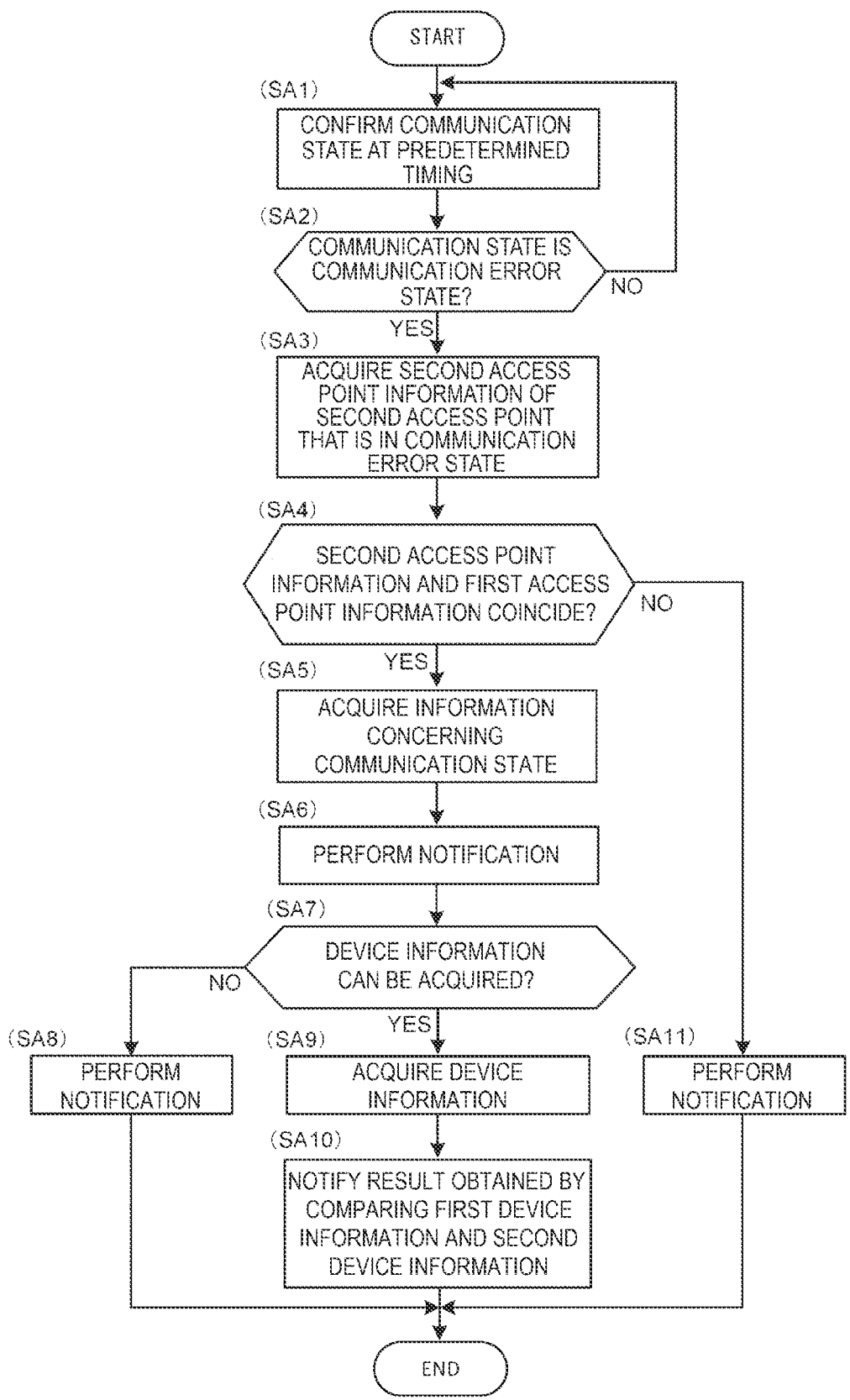
FIG. 4 is a flowchart of a device management program.

FIG. 4 is a flowchart showing the operation of the terminal device 5 that executes the device management program according to this embodiment. FIG. 4 shows an operation at the time when the device management program is executed by the terminal device 5.

The terminal device 5 performs communication via the first access point relating to the first access point information stored in the storing unit 30. The storing unit 30 stores the first access point and the first access point information in correlation with each other in advance. The first access point is an access point where a communication state was normal in previous communication.

The terminal device 5 confirms a communication state at predetermined timing with the communication-state confirming unit (step SA1). When the communication state is a communication error state (YES in step SA2), the terminal device 5 acquires, with the access-point-information acquiring unit 40, information concerning the second access point relating to an access point that is in the communication error state (step SA3). The information concerning the second access point corresponds to the second access point information. When the communication state is normal and is not the communication error state (NO in step SA2), the terminal device 5 returns to step SA1.

The determining unit 45 compares the first access point information stored by the storing unit 30 and the second access point information acquired by the access-point-information acquiring unit 40. The determining unit 45 determines whether the second access point information and the first access point information coincide (step SA4). When the second access point information and the first access point information coincide (YES in step SA4), the communication-state-information acquiring unit 50 acquires information concerning a communication state with the access point 10 (step SA5). The communication-state-information acquiring unit 50 acquires a communication state such as signal strength at a communication time or presence or absence of noise. The communication-state notifying unit 55 causes, based on the communication state with the access point 10 acquired by the communication-state-information acquiring unit 50, the terminal device 5 to perform a notification of information concerning the communication state (step SA6). When the signal strength is low or a lot of noise is present, the terminal device 5 performs a notification indicating that the communication state is bad.

When the communication state between the terminal device and the access point 10 is normal (YES in step SA7), the communication-state-information acquiring unit 50 acquires device information concerning the printing device 20 via the access point (step SA9).

When the communication-state-information acquiring unit 50 cannot acquire the device information (NO in step SA7), the communication-state notifying unit 55 performs a notification indicating to that effect(step SA8) and ends the processing.

When the communication-state-information acquiring unit 50 can acquire the device information (YES in step SA7), after the communication-state-information acquiring unit 50 acquires the device information (step SA9), the communication-state notifying unit 55 notifies a result obtained by comparing the first device information and the second device information (step SA10). The device information acquired by the communication-state-information acquiring unit 50 corresponds to the second device information. The second device information includes second IP address information and a device name.

When the determining unit 45 determines that the first device name and the second device name coincide and the first IP address and the second IP address do not coincide, the communication-state notifying unit 55 performs a notification indicating to that effect. The notification is desirably a notification for notifying that a setting change for the IP address of the printing device 20 is necessary.

When the second access point information and the first access point information do not coincide (NO in step SA4), the communication-state notifying unit 55 performs a notification (step SA11) and ends the processing. The notification is desirably a notification for notifying that a communication setting change for the access point 10 in the terminal device 5 is necessary.

In the operation explained above, the determination processing for determining whether the device information can be acquired and the subsequent processing are performed in step SA7 and subsequent steps. However, the determination processing and the subsequent processing may be performed immediately after step SA2.

In this embodiment, the notification may be output to the output unit 33 in FIG. 2 explained above. The notification may be a notification for displaying a message as an image on the screen of the screen display device, which is the output unit 33.

The notification may be voice information.

A device management program according to this embodiment is a device management program operating in the terminal device 5 that communicates with the printing device 20, which is a device, via an access point, the device management program causing the terminal device 5 to function as the storing unit 30 that stores first access point information concerning a first access point and first device information concerning the printing device 20 connected via the first access point in correlation with each other in advance, the communication-state confirming unit 35 that confirms a communication state at predetermined timing, the access-point-information acquiring unit 40 that, when the communication state confirmed by the communication-state confirming unit 35 is a communication error state, acquires second access point information concerning a second access point that is in the communication error state, the determining unit 45 that determines whether the acquired second access point information and the first access point information stored in advance coincide, the communication-state-information acquiring unit 50 that acquires information concerning communication of the printing device 20 when the determining unit 45 determines that the acquired second access point information and the first access point information stored in advance coincide, and the communication-state notifying unit 55 that performs a notification based on the information acquired by the communication-state-information acquiring unit 50.

When a communication error occurs, it is possible to discriminate a cause of the occurrence of the communication error by acquiring communication state information from the access point 10 and the printing device 20 and notify the cause to the user.

In the device management program according to this embodiment, when the communication-state-information acquiring unit 50 cannot acquire the device information, the communication-state notifying unit 55 performs the notification indicating to that effect.

When the communication error occurs and the device information cannot be acquired, it is possible to notify the user to that effect. Therefore, there is an effect that the user can learn the communication state in detail and easily take measures.

In the device management program according to this embodiment, the notification indicates that the device 20, which is the device, is not connected to the second access point.

When the communication error occurs and the device information cannot be acquired, the notification indicating that the printing device 20 is not connected to the second access point is performed. Therefore, there is an effect that the user can easily take measures.

In the device management program according to this embodiment, the first device information includes a first device name and a first IP address, the information is second device information including a second device name and a second IP address, and the communication-state notifying unit 55 acquires the second device information with the communication-state-information acquiring unit 50, and, when the determining unit 45 determines that the first device name and the second device name coincide and the first IP address and the second IP address do not coincide, the communication-state notifying unit 55 performs the notification indicating to that effect.

It is possible to notify that device names coincide and IP addresses do not coincide. It is possible to notify the user that communication setting for the printing device 20 is different. Therefore, there is an effect that the user can recognize that connection is performed if measures for changing the IP addresses are taken in the terminal device 5.

The device management program according to this embodiment causes the terminal device 5 to function such that the predetermined timing for causing the communication-state confirming unit 35 to confirm the communication state is periodic timing.

There is an effect that the user can periodically confirm the communication state and easily take measures suitable for the acquired communication state.

The device management program according to this embodiment causes the terminal device 5 to function such that the predetermined timing for causing the communication-state confirming unit 35 to confirm the communication state is a program start time.

There is an effect that the user can confirm the communication state at the program start time and easily take measures suitable for the acquired communication state.

Figure 5:
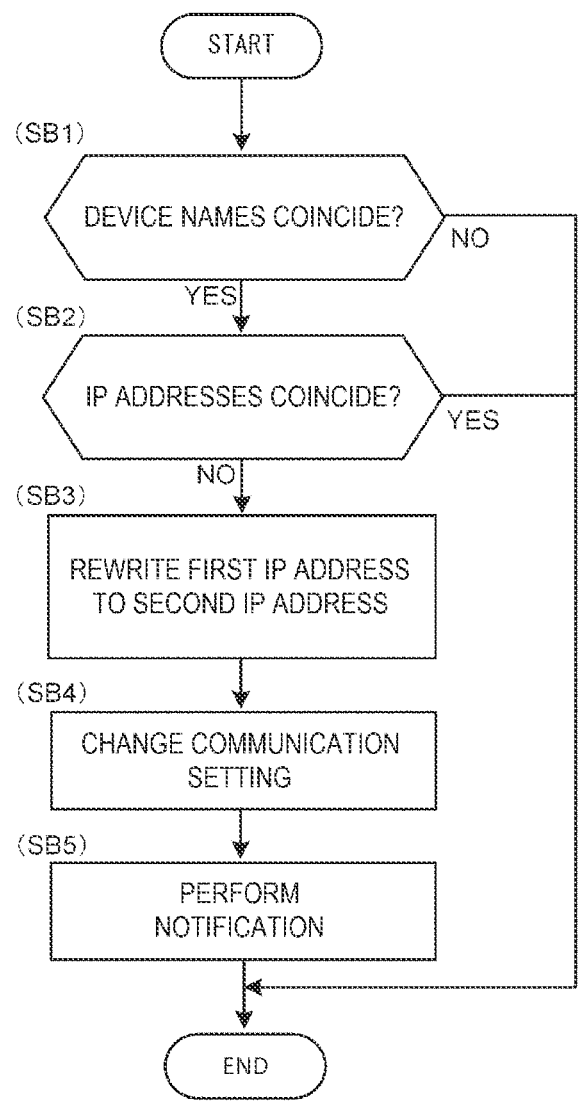
FIG. 5 is a flowchart of a device management program according to a modification.

FIG. 5 is a flowchart showing the operation of the terminal device 5 that executes a device management program according to a modification of the first embodiment. The operation of the terminal device 5 after a state in which the device management program according to the modification is executed up to step SA7 in the terminal device 5 and the device information can be acquired (YES in step SA7) is explained.

The terminal device 5 determines, with the determining unit 45, whether the first device name included in the first device information and the second device name included in the second device information coincide (step SB1). When the first device name and the second device name coincide (YES in step SB1), the determining unit 45 determines whether the first IP address included in the first device information and the second IP address included in the second device information coincide (step SB2). When the first IP address and the second IP address do not coincide (NO in step SB2), the terminal device 5 rewrites the first IP address to the second IP address with the rewriting unit 60 (step SB3). The communication-setting changing unit 65 changes the communication setting in the terminal device 5 (step SB4) and notifies that the communication setting is changed (step SB5).

When the first device name and the second device name do not coincide (NO in step SB1), the terminal device 5 ends the processing. At this time, the terminal device 5 may notify that the first device name and the second device name do not coincide.

When the first IP address and the second IP address coincide (YES in step SB2), the terminal device 5 ends the processing. Since both of the device name and the IP address of the printing device 20 coincide, the terminal device 5 and the printing device 20 should be connectable. Nevertheless, the terminal device 5 is in the communication error state. Since this is an abnormal state, the terminal device 5 desirably notifies to that effect.

In this modification, the notification may be output to the output unit 33 in FIG. 2 explained above. The notification may be a notification for displaying a message as an image on the screen of the screen display device, which is the output unit 33.

The notification may be voice information.

The device management program according to the modification causes the terminal device 5 to function as the rewriting unit 60 that rewrites the first IP address to the second IP address when the device names coincide and the IP addresses do not coincide.

When the device names coincide and the IP addresses do not coincide, it is possible to connect the terminal device 5 and the printing device 20 by changing the communication setting to an IP address acquired anew.

The device management program according to this embodiment causes the terminal device 5 to function as the communication-setting changing unit 65 that changes, in the network connection of the terminal device 5, the communication setting concerning the connection to the printing device 20 to communication setting in which the second IP address is used.

When the device names coincide and the IP addresses do not coincide, it is possible to change the communication setting and connect the terminal device 5 and the printing device 20.

The device management program according to this embodiment causes the terminal device 5 to function such that the communication-state notifying unit 55 performs a notification indicating that the communication-setting changing unit 65 has changed the first IP address included in the communication setting concerning the connection to the printing device 20 to the second IP address.

There is an effect that the user can easily recognize that the communication setting concerning the connection to the printing device 20 is changed to the communication setting in which the second IP address is used.

A device management method according to a second embodiment is explained below.

The device management method according to the second embodiment is a device management method for the terminal device 5, which is a control device that communicates with a device via an access point, the device management method including communicating with the printing device 20, which is the device, via a first access point, when communicating with the printing device 20, storing first access point information concerning the first access point and first device information concerning the printing device 20, which communicates via the first access point, in correlation with each other in advance, confirming a communication state at predetermined timing, when the confirmed communication state is a communication error state, acquiring second access point information concerning the access point that is in the communication error state, determining whether the acquired second access point information and the first access point information stored in advance coincide, when determining that the second access point information and the first access point information coincide, confirming the communication with the printing device 20, and performing a notification concerning the communication with the printing device 20 based on a result obtained by confirming the communication with the printing device 20.

When a communication error occurs, the terminal device 5 can discriminate a cause of the occurrence of the communication error by acquiring communication state information from the access point and notify the cause to the user. When an SSID, which is access point information, is different from a stored SSID, the terminal device 5 can notify that the communication error occurs because the access point is changed. Therefore, there is an effect that the user can easily take measures.

The embodiments explained above only indicate aspects and can be optionally modified and applied within the scope of the disclosure.

The embodiments shown in the figures and explained above are examples. The embodiments are not particularly limited. Hardware individually corresponding to the units do not always need to be implemented. It is naturally possible to adopt a configuration in which one processor executes a program to realize the functions of the units. A part of functions realized by software in the embodiments explained above may be realized by hardware or a part of functions realized by hardware in the embodiments may be realized by software. Besides, a detailed configuration of the operation of the terminal device 5 can be optionally changed without departing from the gist of the present disclosure.

The step units of the operation shown in FIGS. 4 and 5 are divided according to main processing contents in order to facilitate understanding of the operation of the terminal device 5 configuring the printing system 1 and are not limited by a way of division and names of processing units. The steps may be divided into a larger number of step units according to processing contents. One step unit may be divided to include a larger number of kinds of processing. The order of the steps may be changed as appropriate without interfering with the gist of the present disclosure.

What is claimed is:

1. A non-transitory computer-readable medium storing a device management program operating in a control device that communicates with a device via an access point, the device management program causing the control device to function as:
   a storing unit configured to store first access point information concerning a first access point and first device information, which is device information concerning the device connected via the first access point, in correlation with each other in advance;
   a communication-state confirming unit configured to confirm a communication state at predetermined timing;
   an access-point-information acquiring unit configured to, when the communication state confirmed by the communication-state confirming unit is a communication error state, acquire second access point information concerning a second access point that is in the communication error state;
   a determining unit configured to determine whether the acquired second access point information and the first access point information stored in advance coincide;
   a communication-state-information acquiring unit configured to acquire information concerning the communication with the device when the determining unit determines that the acquired second access point information and the first access point information stored in advance coincide; and
   a communication-state notifying unit configured to perform a notification based on the information acquired by the communication-state-information acquiring unit.

2. The non-transitory computer-readable medium according to claim 1, wherein, when the communication-state-information acquiring unit cannot acquire the device information, the communication-state notifying unit performs the notification indicating to that effect.

3. The non-transitory computer-readable medium according to claim 2, wherein the notification indicates that the device is not connected to the second access point.

4. The non-transitory computer-readable medium according to claim 1, wherein
   the first device information includes a first device name and a first IP address,
   the information is second device information including a second device name and a second IP address, and
   the communication-state notifying unit acquires the second device information with the communication-state-information acquiring unit, and, when the determining unit determines that the first device name and the second device name coincide and the first IP address and the second IP address do not coincide, the communication-state notifying unit performs the notification indicating to that effect.

5. The non-transitory computer-readable medium according to claim 4, further comprising causing the control device to function as a rewriting unit configured to rewrite the first IP address to the second IP address.

6. The non-transitory computer-readable medium according to claim 5, further comprising causing the control device to function as a communication-setting changing unit configured to change the first IP address included in communication setting concerning the connection to the device to the second IP address.

7. The non-transitory computer-readable medium according to claim 6, wherein the communication-state notifying unit performs the notification indicating that the communication-setting changing unit changed the first IP address included in the communication setting concerning the connection to the device to the second IP address.

8. The non-transitory computer-readable medium according to claim 1, wherein the predetermined timing is periodic timing.

9. The non-transitory computer-readable medium according to claim 1, wherein the predetermined timing is a program start time.

10. A device management method for a control device that communicates with a device via an access point, the device management method comprising:
   communicating with the device via a first access point;
   when communicating with the device, storing first access point information concerning the first access point and first device information concerning the device, which communicates via the first access point, in correlation with each other in advance;
   confirming a communication state at predetermined timing;
   when the confirmed communication state is a communication error state, acquiring second access point information concerning an access point that is in the communication error state;
   determining whether the acquired second access point information and the first access point information stored in advance coincide;
   when determining that the second access point information and the first access point information coincide, confirming the communication with the device; and
   performing a notification concerning the communication with the device based on a result obtained by confirming the communication with the device.

* * * * *